Sept. 27, 1927.  J. DIXON  1,643,927
SNUBBER
Filed Sept. 8, 1925

INVENTOR.
JAMES DIXON
BY Munn & Co.
ATTORNEYS.

Patented Sept. 27, 1927.

1,643,927

UNITED STATES PATENT OFFICE.

JAMES DIXON, OF PHOENIX, ARIZONA.

SNUBBER.

Application filed September 8, 1925. Serial No. 55,140.

My invention relates generally to shock absorbers for motor and other forms of vehicles, and more particularly to snubbers for checking the rebound of the vehicle springs and body.

It is a purpose of my invention to provide a snubber of extremely simple, inexpensive and durable construction which is readily applicable to vehicles and constantly operable to effectively snub excessive rebound of a vehicle's springs and its body to prevent breaking of the springs and vibration of the body.

I will describe only one form of snubber embodying my invention, and will then point out the novel features thereof in claims.

In the accompanying drawings.

Figure 1:
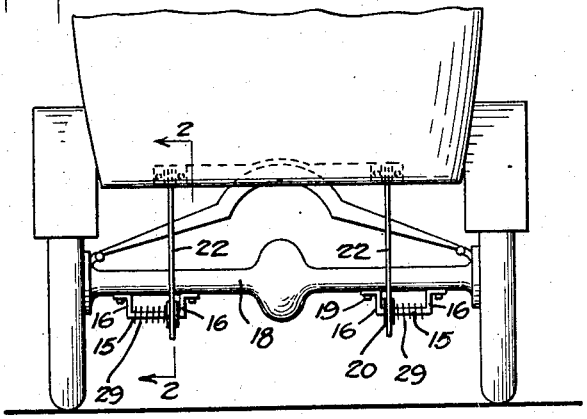
Figure 1 is a view showing in rear elevation a motor vehicle having applied thereto one form of snubber embodying my invention.

Referring specifically to the drawings, in which similar reference characters refer to similar parts in each of the views, my invention in its present embodiment comprises a pair of snubbing units shown in Figure 1 as associated with the rear end of a motor vehicle for cooperation with the rear springs of the vehicle, it being understood, however, that in actual practice another pair of snubbing units are adapted to be associated with the front end of the motor vehicle for coaction with the front springs of the vehicle. As the two units are identical in construction, a description of one will suffice for both.

Each unit comprises a shaft 15, the ends of which are upturned to provide parallel extensions 16 formed at their extremities with plates 17 adapted to be secured to the axle housing 18 of a motor vehicle by means of bolts 19. In this manner the shaft 15 is rigidly supported in depending relation to the axle housing 18.

Rotatable on the shaft 15 is a ratchet wheel 20, the teeth of which extend in one and the same direction circumferentially of the wheel for cooperation with the teeth 21 of a rack bar 22. The rack bar 22 is pivoted at the point indicated at 23 on a bracket 24 secured to the vehicle frame 25 by bolts 26. By means of a spring or other yieldable member 27 secured to the bracket 24 by the bolts 26, the rack bar is urged toward the ratchet wheel 20 so that its teeth 21 have operative engagement with the teeth of the ratchet wheel. The ratchet wheel is formed with flanges 28 which serve to confine the rack bar against lateral displacement so that its teeth 21 are maintained in operative engagement with the ratchet wheel.

Figure 4:
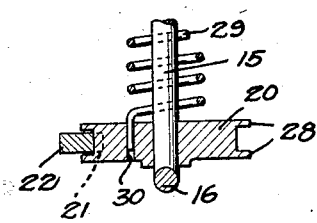
Figure 4 is a sectional view taken on line 4—4 of Figure 2.

The ratchet wheel 20 can rotate in either direction on the shaft 15 but against the action of a coil spring 29, one end of which is secured to one of the extensions 16 while its opposite end is extended into an opening 30 of the ratchet wheel 20, as clearly shown in Figure 4.

Figure 2:
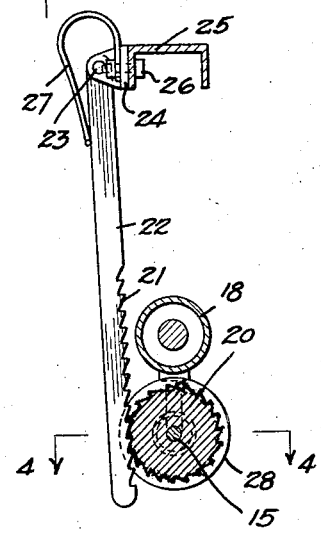
Figure 2 is a vertical sectional view taken on the line 2—2 of Figure 1.
Figure 3:
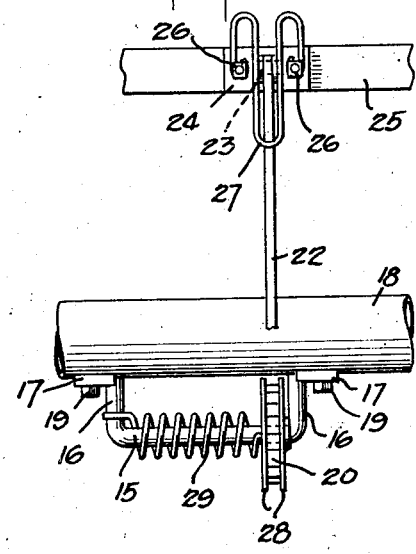
Figure 3 is an enlarged fragmentary view showing in rear elevation one of the snubbing units embodied in the snubber shown in the preceding views.

In practice, the two snubbing units are arranged at opposite sides of the longitudinal center of the vehicle, as clearly shown in Figure 1, and in the normal position of the units the rack bars 22 are in their uppermost positions, as illustrated to advantage in Figure 2, but in engagement with the ratchet wheels 20. Upon upward movement of the rear axle of the vehicle or upon downward movement of the vehicle body the rack bars 22 move downwardly and by virtue of the arrangement of the teeth 21 of the rack bar and the teeth of the ratchet wheel, the teeth 21 will slide or ride over the ratchet wheel without rotating the latter, the spring 27 permitting the rack bar to yield rearwardly during this operation. In this manner the snubbing units permit the unrestricted downward movement of the vehicle body with respect to the wheels or the upward movement of the wheels with respect to the body so that the springs of the vehicle are flexed in the usual manner. However, upon upward movement of the vehicle body under the movement of the springs to normal position, the rack bars are moved upwardly, their teeth 21 engaging the ratchet wheels and rotating the latter upon rotation of the ratchet wheels the springs 29 are wound to resist the movement of the ratchet wheels and consequently the upward movement of the rack bars, wherefore it will be seen that the rebound or upward movement of the vehicle body and springs is snubbed or checked.

Although I have shown and described only one form of snubber embodying my invention, it is to be understood that various changes and modifications may be made herein without departing from the spirit of the invention and the sprit and scope of the appended claims.

What I claim is:

1. A snubber comprising a ratchet wheel mounted for rotational movement, means for urging the ratchet wheel to a definite position, and a ratchet bar yieldably urged into engagement with the ratchet wheel and adapted to be moved longitudinally, the teeth of said bar and the teeth of said wheel being arranged so that the wheel is rotated against the action of said urging means when the bar is moved longitudinally in one direction.

2. A snubber as embodied in claim 1 wherein a shaft is provided upon which the ratchet wheel is rotatable, and a coil spring is fixed to the shaft and to the wheel to yieldingly oppose the rotation of the wheel.

3. A snubber comprising a ratchet wheel mounted for rotational movement, a spring for yieldingly maintaining the wheel against rotation, a rack bar pivoted and having teeth adapted to cooperate with the teeth of the ratchet wheel to effect rotation of the latter when moved longitudinally in one direction, and a spring for urging the bar into engagement with the wheel.

4. A snubber as embodied in claim 3 wherein the ratchet wheel is provided with flanges to maintain the rack bar against lateral displacement from the wheel.

JAMES DIXON.